US009928125B1

(12) United States Patent
Phillips et al.

(10) Patent No.: US 9,928,125 B1
(45) Date of Patent: Mar. 27, 2018

(54) MESSAGE QUEUEING IN MIDDLEWARE BY A MESSAGE BROKER (71) Applicant: International Business Machines Corporation, Armonk, NY (US)

(72) Inventors: William F. Phillips, Endicott, NY (US); Victor M. Lourenco, Vestal, NY (US); Patrick J. Clas, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/697,508

(22) Filed: Sep. 7, 2017

Related U.S. Application Data (63) Continuation of application No. 15/648,483, filed on Jul. 13, 2017.

(51) Int. Cl.
*H04L 29/06* (2006.01)
*H04L 29/08* (2006.01)
*G06F 9/54* (2006.01)

(52) U.S. Cl.
CPC ........ *G06F 9/546* (2013.01); *G06F 2209/541* (2013.01)

(58) Field of Classification Search
CPC ........... G06F 9/546; G06F 9/4881; G06F 9/50
See application file for complete search history.

(56) References Cited

U.S. PATENT DOCUMENTS

| 7,496,912 | B2 * | 2/2009 | Keller | G06F 8/61 |
| | | | | 717/120 |
| 7,885,844 | B1 | 2/2011 | Cohen et al. | |
| 8,447,921 | B2 | 5/2013 | Boecker et al. | |
| 8,990,812 | B2 | 3/2015 | Krishnaraj et al. | |
| 9,021,076 | B2 | 4/2015 | Austen et al. | |
| 2007/0288423 | A1 * | 12/2007 | Kimoto | G06F 8/65 |
| 2017/0092149 | A1 | 3/2017 | Chen et al. | |

OTHER PUBLICATIONS

"Avoiding Duplicate Tasks in Celery Broker" —Stack Overflow, Nov. 2014 https://stackoverflow.com/questions/26831103/avoiding-duplicate-tasks-in-celery-broker.*
IBM, "Java Asyncronous Method Execution Facility", An IP.com Prior Art Database Technical Disclosure, Original Publication Date: Mar. 25, 2004, IP.com Electronic Publication Date: Mar. 25, 2004, IP.com No. IPCOM000022690D, 4 pages.

(Continued)

*Primary Examiner* — Randy Scott
(74) *Attorney, Agent, or Firm* — Nicholas D. Bowman (57) ABSTRACT

A message broker configured to handle messages received from a plurality of client applications comprises a plurality of message queues that are each associated with a different task. A first synchronous message is received at a first message queue from a first client application. A determination is made that at a time the first synchronous message is received there is an earlier-received message from a different client application waiting in the first message queue. In response to the determination, the first synchronous message is coalesced with the earlier-received message such that a task associated with the first message queue is executed only once for both messages and a notice of the execution is returned to the first client application.

1 Claim, 6 Drawing Sheets

(56) References Cited

OTHER PUBLICATIONS

Hewlett Packard, "HPE NonStop Message Queue Software", Java Messaging System on NonStop, 8 pages, © Copyright 2014-2016 Hewlett Packard Enterprise Development LP.

IBM, "Method and System of Supporting Asynchronous and Reliable Bulk Processing", An IP.com Prior Art Database Technical Disclosure, Original Publication Date: Aug. 3, 2009, IP.com Electronic Publication Date: Aug. 3, 2009,IP.com No. IPCOM000185963D, 4 pages.

IBM, "FIFO Message Processing", Sterling B2B Integrator, Version 5.2, 22 pages, © Copyright IBM Corp. 2000, 2015.

Wikipedia, "Apache ActiveMQ", From Wikipedia, the free encyclopedia, last edited on Apr. 20, 2017, printed Jul. 11, 2017, 3 pages.

Phillips et al., "Message Queueing in Middleware by a Message Broker", U.S. Appl. No. 15/648,483, filed Jul. 13, 2017.

IBM, List of IBM Patents or Patent Applications Treated as Related, Sep. 6, 2017, 2 pages.

\* cited by examiner

FIG. 6

# MESSAGE QUEUEING IN MIDDLEWARE BY A MESSAGE BROKER

BACKGROUND

The present disclosure relates generally to the field of data processing, and, more particularly, to message queuing in middleware by a message broker.

Middleware generally, and message-oriented middleware in particular, is useful for managing communication between components in distributed computing environments. Among the most important features of message-oriented middleware are message brokers. As used herein a message broker may refer to software and/or hardware that is used to translate messages between formal messaging protocols of differing components and to route these translated messages among the components. Message brokers often incorporate message queues that temporarily store messages that are in transit between senders and recipients.

SUMMARY

Embodiments of the present disclosure include a method for using a message broker. The message broker comprises a plurality of message queues. Each message queue is associated with a different task of a plurality of tasks. The message broker is configured to handle messages received from a plurality of client applications. As part of the method, a first synchronous message is received at a first message queue of the plurality of message queues. The first message is received from a first client application of the plurality of client applications. A determination is made that at a time the first synchronous message is received there is an earlier-received message waiting in the first message queue. The earlier-received message is from a different client application. In response to the determination, the first synchronous message is coalesced with the earlier-received message such that a task associated with the first message queue is executed only once for both messages and a notice of the execution is returned to the first client application.

Embodiments of the present disclosure further include a computer program product for using a message broker. The message broker comprises a plurality of message queues. Each message queue is associated with a different task of a plurality of tasks. The message broker is configured to handle messages received from a plurality of client applications. The computer program product is a computer readable storage medium that has program instructions embodied thereon. The program instructions are configured to cause a computer to perform a method. As part of the method, a first synchronous message is received at a first message queue of the plurality of message queues. The first message is received from a first client application of the plurality of client applications. A determination is made that at a time the first synchronous message is received there is an earlier-received message waiting in the first message queue. The earlier-received message is from a different client application. In response to the determination, the first synchronous message is coalesced with the earlier-received message such that a task associated with the first message queue is executed only once for both messages and a notice of the execution is returned to the first client application.

Embodiments of the present disclosure further include a system for using a message broker. The message broker comprises a plurality of message queues. Each message queue is associated with a different task of a plurality of tasks. The message broker is configured to handle messages received from a plurality of client applications. The system includes a processor and a memory. The processor is in communication with the memory and is configured to obtain instructions from the memory that cause the processor to perform a method. As part of the method, a first synchronous message is received at a first message queue of the plurality of message queues. The first message is received from a first client application of the plurality of client applications. A determination is made that at a time the first synchronous message is received there is an earlier-received message waiting in the first message queue. The earlier-received message is from a different client application. In response to the determination, the first synchronous message is coalesced with the earlier-received message such that a task associated with the first message queue is executed only once for both messages and a notice of the execution is returned to the first client application.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of data processing, and, more particularly, to handling messages by a message broker. While the present disclosure is not necessarily limited to such applications, various aspects of the disclosure may be appreciated through a discussion of various examples using this context.

In distributed computing environments, client applications may make redundant requests (messages) that cause a particular task to be executed repeatedly by a server application over a short period of time. These duplicative messages can put unnecessary strain on computing resources. Embodiments of the present disclosure may reduce this strain by coalescing certain duplicative messages to reduce the number of times that a requested task needs to be executed. The coalescing may occur transparently to the requesting client applications such that they have no knowledge of (or are agnostic as to) whether their messages have been coalesced with other messages that are sent by other client applications. Furthermore, some embodiments include different queues for each type of task (command) and may implement cross-platform communications (e.g., between C and Java) using these queues.

Figure 1:
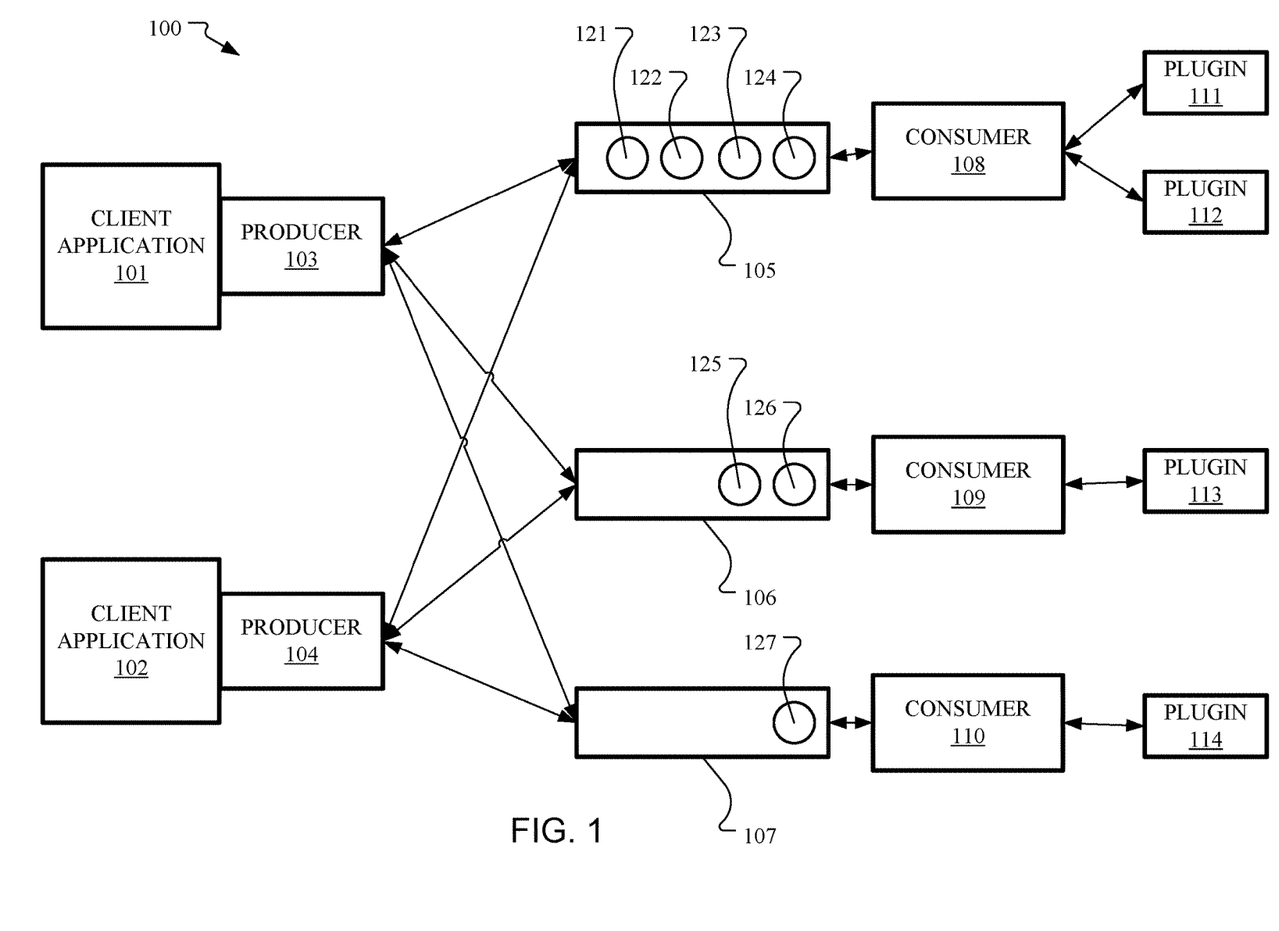
FIG. 1 illustrates a block diagram of an example message broker being used to handle messages in a distributed computing environment, in accordance with embodiments of the present disclosure.

Referring now to the figures, shown in FIG. 1 is a block diagram of an example message broker being used to handle messages in a distributed computing environment 100, in accordance with embodiments. As shown, the environment 100 includes client applications 101 and 102 that send messages 121-127 incorporating tasks to be executed by one or more server applications. These messages may be synchronous or asynchronous. In some embodiments, the client applications 101 and 102 may be located on remote computers that access the server applications via a network. In other embodiments, the client applications and server applications reside together on a single physical server or coupled collection of servers.

When sending task requests via the message broker, the client applications 101 and 102 use producers 103 and 104 to generate messages incorporating the task requests. In embodiments, these producers 103 and 104 may provide sendMessage( ) functions for their respective client applications 101 and 102. These functions are used to direct messages to the proper queues 105-107 by specifying a message identifier (msgid) and, optionally, other information such as timeout values and various indicators (e.g., flags). As used herein, a msgid may refer to a string of characters that is passed to the sendMessage( ) function and used (e.g., by a consumer) to look up relevant information associated with a particular message (e.g., queue names, plugin names, required parameters, etc.).

Upon being properly formatted by a producer 103 or 104, the message is then routed to a designated consumer 108, 109, or 110 that is configured to parse the received message and use one or more plugins 111, 112, 113, and 114 that call the appropriate functions to complete the requested task indicated in the message. In some embodiments, the consumer 108-110 uses the msgid to look up relevant information such as plugin name and required parameters to be passed to the proper plugin. As used herein, a plugin may refer to a user supplied shared object or Java class which contains the operations which are to be run in response to a message received from a producer. In embodiments, an interface to the plugin is standardized for multiple programming languages (e.g., Java and C) and is used to pass data into the plugin and receive any return data from the plugin. The code in the plugin may be user defined and can be anything from a simple function call to a complex operation.

As shown, each consumer 108, 109, and 110 includes a separate message queue, 105, 106, or 107, respectively, that is configured to hold messages 121-127. As used herein, queued messages may be considered either waiting or currently running (e.g., currently being processed or having the task with which they are associated being executed). For example, messages 121, 122, 123, and 125 are deemed waiting on the queues, while messages 124, 126, and 127 (the messages at the very front of the queues) are deemed currently running on the queues. As represented by the arrows between the two producers 103 and 104 and the queues 105-107, each client application 101 or 102 may have messages routed to each consumer 108-110 (e.g., as in a many-to-many relationship). In contrast, according to embodiments, each consumer 108-110 may be associated with a single type of task. Thus, depending on the task the client application 101 or 102 needs performed, the appropriate consumer 108-110 is identified.

In some embodiments, a set (i.e., one or more) of XML files may be used to define how communication across the message broker occurs. Such an XML file creates easy interoperability among the components of the environment by defining a standard communication format that allows the client applications to have a variety of tasks executed via many different consumers without needing the producers and/or consumers to be recoded for each type of task request. Such an XML file may be used frequently by the message broker system. For example, the XML file may be used (e.g., during a boot operation) to define tasks (and their respective associated queues 105-107), set the names for the plugins 111-114 (which may be user-provided), and specify any required parameters needed for each task. When messages are generated, producers 103 and 104 may use the XML file to determine the proper formatting in which to arrange the information provided to them from their respective client applications 101 and 102 such that the resulting messages are sent to the proper queues 105-107 with the required values (e.g., values for particular parameters of importance to the server application to be called). Consumers 108-110 may likewise read the XML document upon receipt of messages such that they are able to call the correct plugins 111-114 and provide them with the information necessary for execution of the requested task.

In some embodiments, having a different consumer 108-110 (and queue 105-107) associated with each task can have certain advantages. For example, because they are queued up separately, different tasks may be executed concurrently. This helps to ensure that the execution of time-consuming and/or complex tasks does not unduly interfere with the faster execution of simpler tasks. In addition, having separate queues for each task also aids in the coalescing of tasks of the same type, which can make task executions even more efficient.

A set of comparative examples are provided to illustrate these potential efficiency gains. In these examples, two task types are requested: task A, which is a quickly executed task, and task B, which takes longer to execute. In a first example, a single queue is provided that contains six messages that request execution of both task types. The order of the requests (first to last, with the first task A currently executing and the other five tasks waiting) is AABBAB. In this example, the A tasks will execute relatively slowly, as they are held up by the more complex B tasks. In addition, both tasks A and B will need to be executed many times (three times each in this example). This creates an inefficient use of resources. The first example is juxtaposed against a second example, in which each type of task is queued separately and awaiting messages within each queue are coalesced together. In this second example, a first queue receives the three messages requesting task A and is able to coalesce the two waiting (later received) messages together such that the task is only executed twice for all three requests combined.

Likewise, a second queue that receives all three messages requesting task B is able coalesce them together for more efficient execution as well. It is clear from these comparative examples the possible efficiencies that embodiments of the disclosure can create.

Figure 2:
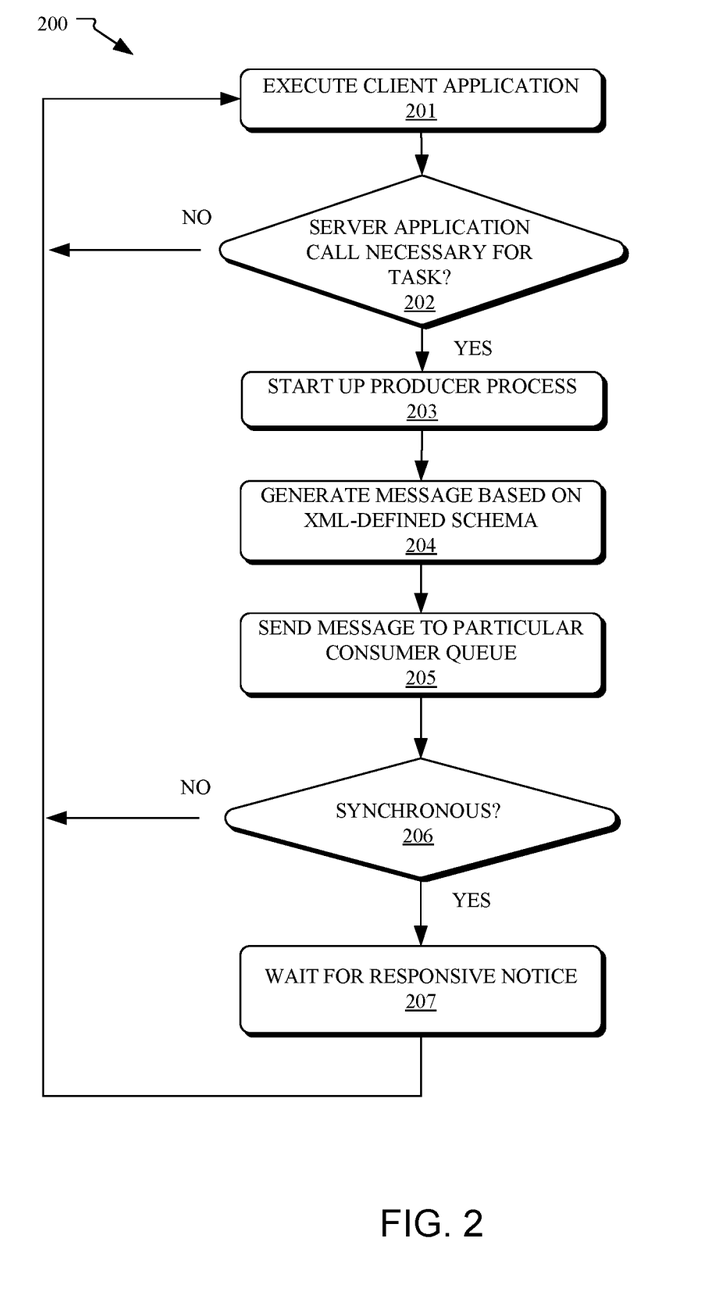
FIG. 2 illustrates a flow diagram of a method of using a client application to request execution of a task via a message broker, in accordance with embodiments of the present disclosure.

Referring now to FIG. 2, shown is a flow diagram of a method 200 of using a client application to request execution of a task via a message broker, in accordance with embodiments. In some embodiments, operations of the method 200 may be performed by a client application (e.g., client application 101 of FIG. 1) operating on a processor of a computer (e.g., computer system 601 of FIG. 6). The method 200 may begin at operation 201, wherein the client application is executing its standard processes. Per operation 202, a determination is made as to whether a call to a server application is necessary for execution of a particular task. If not, then the client application continues its internal executions per operation 201. If such a call is necessary, then, per operation 203, the client application starts up a producer process. Per operation 204, the producer process generates a message to be sent to the message broker. The message format may be defined based on an XML schema. The message may indicate (as defined based on an XML file), the platform where the desired plugin resides (e.g., C or Java), a timeout value, parameters to be passed to the plugin, and parameters to be passed back from the plugin (if synchronous). The parameters included in the message may include a msgid parameter, a mapMessage parameter (used to pass data to and from the plugin), an isSynchronous parameter (indicating whether the message is synchronous), and a forceMsg parameter (indicating whether the message may be coalesced in the queue). Per operation 205, the producer sends the message to the appropriate consumer queue for the particular task to be performed.

Per operation 206, a determination is made as to whether the message is synchronous. If not, then client application continues normal execution per operation 201 (e.g., returns to user). If the message is synchronous, then, per operation 207, there may be a need to wait for a responsive notice indicating that the task has been completed before proceeding again to operation 201. In some embodiments, the responsive notice for a synchronous message may be received via a return of the sendMessage( ) function. Specifically, the function will hold until the task is complete. After the task completes, the return values are sent back to the client application. The return values may be contained in format defined by the mapMessage parameter.

Figure 3:
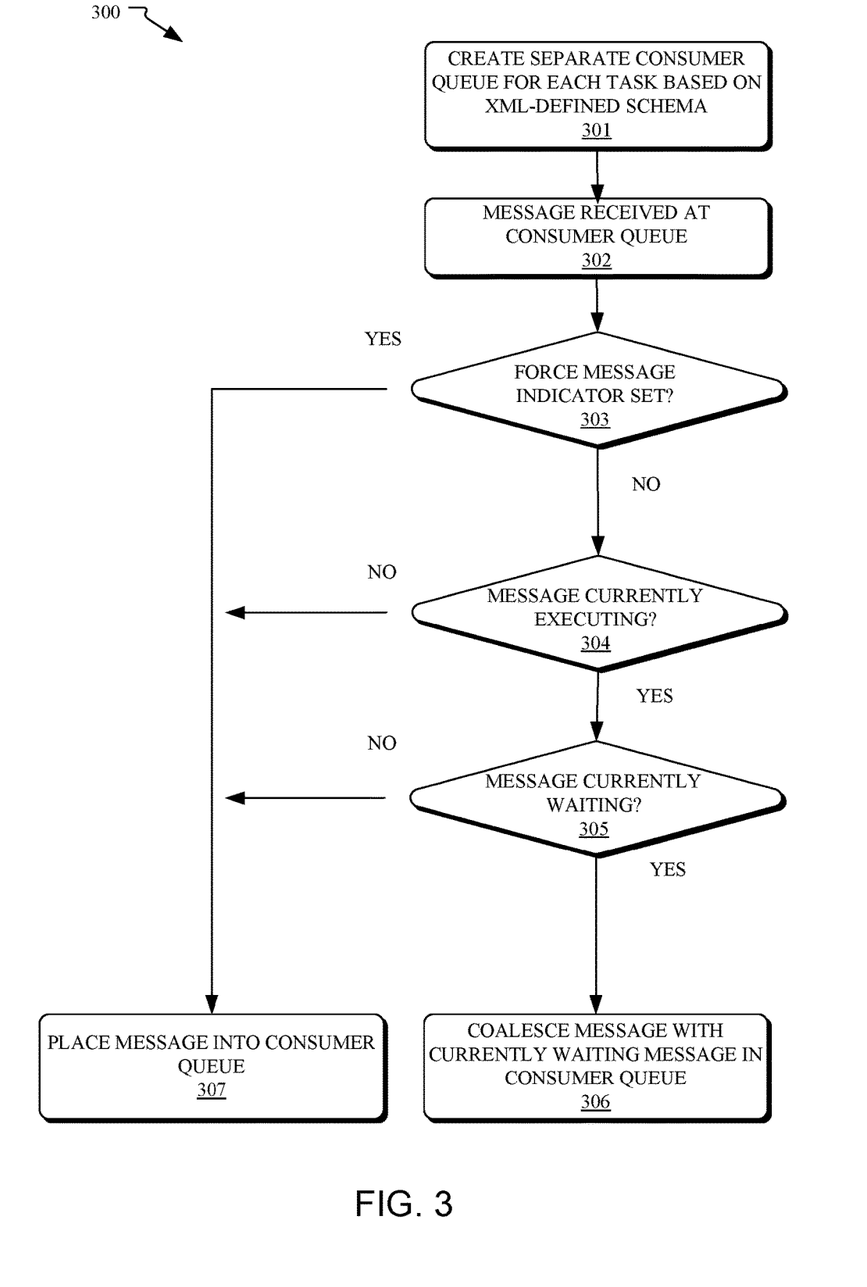
FIG. 3 illustrates a flow diagram of a method of using a message broker to manage the queuing of messages, in accordance with embodiments of the present disclosure.

Referring now to FIG. 3, shown is a flow diagram of a method 300 of using a message broker to manage the queuing of messages, in accordance with embodiments. In some embodiments, operations of the method 300 may be performed by a message broker operating on a processor of a computer (e.g., computer system 601 of FIG. 6). The method 300 may begin at operation 301, wherein a separate queue is created for each task based on an XML schema. This may occur, for example, during boot up of the distributed system. Per operation 302, a message is received at one of the queues. Per operation 303, a determination is made as to whether a force message indicator is set for the message. As used herein a force message indicator may refer to a flag, bit, or other indicator, the presence or absence of which is used on a per message basis to indicate whether that particular message may be coalesced with another earlier-received message waiting in the same queue.

If in operation 302, it is determined that the indicator is set, then the message is placed in the queue (at the back) per operation 307. If not, then, per operation 304, a determination is made as to whether there is a message from the queue currently executing. If not, then the message is placed in the queue, per operation 307, for (immediate) execution. If there is a message currently executing on the queue, then, per operation 305, a determination is made as to whether there is an earlier-received message currently waiting in the queue. If not, then the message is placed in the queue (behind the currently executing message) per operation 307. If there is a message currently waiting, then, per operation 306, the received message is coalesced with the currently waiting message in the queue. Embodiments of the method 300 may be repeated for each received message. If a forceMsg flag (or other force execution indicator) is not set to True then each message may be coalesced in its respective queue with other messages that arrive within a short period of time. In some instances this will allow groups of several (e.g., three or more) messages to be coalesced together into one waiting message.

While an example embodiment of the method 300 is described herein, it is contemplated that many variants of this example may be possible. For example, in some embodiments, the client application and/or producer is responsible for performing the check to determine if there is a message currently waiting in the queue. If so, the client application/producer sets a listener to the msgid of the waiting message and doesn't send the new message. Thus, when the results are returned for the waiting message, they are sent not only to the client application that originally sent the waiting message but also to the client application that established the listener.

Some embodiments of the disclosure contemplate that a received message should not be coalesced with an earlier-received message that is being actively executed (rather than one that is waiting in the queue). This is based on the recognition that the currently running message (operation) may not reflect the current state of the distributed computing environment or its components. For example, assume that there is a task currently running to collect data about the computer. While this operation is running, the user makes some changes to the computer and requests that the task be executed again. If this later task request (message) is coalesced with the earlier running task, then the results provided to the user would not reflect the changes the user made to the computer.

Figure 4:
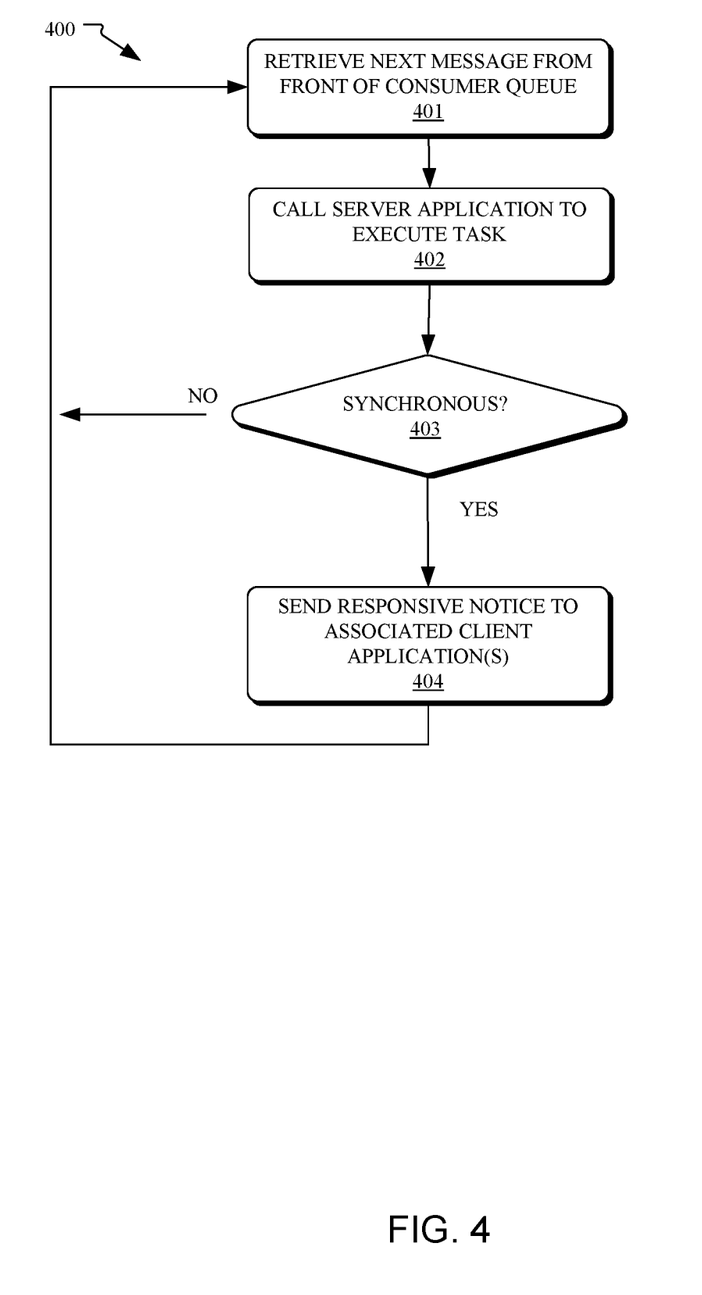
FIG. 4 illustrates a flow diagram of a method of using a message broker to manage the execution of queued messages, in accordance with embodiments of the present disclosure.

Referring now to FIG. 4, shown is a flow diagram of a method 400 of using a message broker to manage the execution of queued messages, in accordance with embodiments. In some embodiments, operations of the method 400 may be performed by a message broker operating on a processor of a computer (e.g., computer system 601 of FIG. 6). The method 400 may begin at operation 401, wherein, upon the consumer becoming available, the next (waiting) message from the front of the message queue associated with that consumer is retrieved. Per operation 402, the appropriate server application is called to execute the task indicated in the message. Per operation 403, a determination is made as to whether the message is synchronous. If not, then the method proceeds back to operation 401 and the next (waiting) message is retrieved from the queue. If the message is synchronous, then, per operation 404, a response is received from the server application upon completion of the task and a responsive notice is sent to the client application associated with the executed task. In situations where the executed task is associated with a coalesced set of messages then the responsive notice is sent to all of the client applications that sent the messages (to the extent that each such message was synchronous). In some situations, this involves the sendMessage( ) function associated with each synchronous message waiting until the earlier-received message has run to return to the client application from which it was sent.

For purposes of illustration, example uses of operations of the methods described herein are now described with reference to the computing environment shown in FIG. 1. In this example, distributed computing system 100 is booted up and for each of the tasks defined in an XML file a separate queue 105-107 (and corresponding separate consumer 108-110) is created. The client applications 101 and 102 perform normal operations as requested by users or other applications. Next, the client application 101 determines that a call to a server application to perform a particular task is necessary. The client application 101 starts up producer 103 and passes the data for performance of the task to the producer 103. The producer 103 then looks up the required information in the XML file and establishes a message in the proper format. Based on its msgid, the message is routed to queue 106. At queue 106, it is determined that there is an earlier-received message 125 from client application 102 already waiting in the queue. In this example, the forceMsg flag is set to False, so the message is coalesced with the earlier received message 125 in the queue 107.

Once the consumer 109 is no longer actively processing a prior message 126, the message 125 is passed to the consumer 110. The consumer 109 looks up the proper plugin 113 in the XML file and passes the message object containing the data to the plugin. If the message sent by client application 101 is asynchronous, then the client application 101 can immediately return to normal operations. If the message sent by client application 101 is synchronous, the client application 101 waits for return values to be passed back to it (e.g., via sendMessage( ) function return) based on execution of the message 125 (with which its message was coalesced). Likewise, if message 125 is itself indicated as synchronous, these same return values are also passed back to client application 102.

Figure 5:
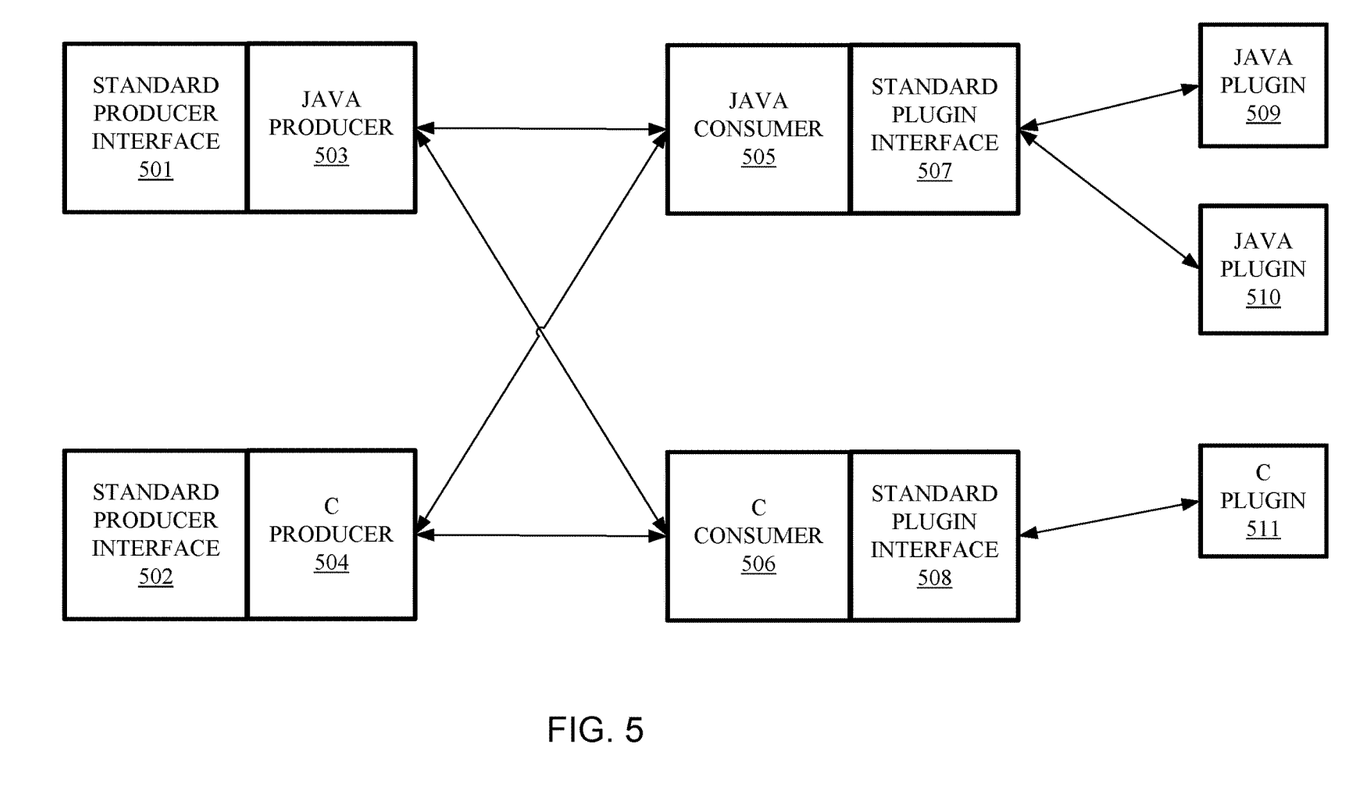
FIG. 5 illustrates a block diagram of an example message broker configured to handle messages in different programming languages, in accordance with embodiments of the present disclosure.

Referring now to FIG. 5, shown is a block diagram of an example message broker configured to handle messages in different programming languages, in accordance with embodiments. In some embodiments, items shown or described in reference to FIG. 5 may be the same as or substantially similar to corresponding items shown or described in reference to FIG. 1 (e.g., with Java producer 503 and C producer 504 corresponding with producers 103 and 104, respectively). Per FIG. 5, embodiments allow for messages between components that utilize different protocols and a variety of platforms. As shown, Java producer 503 and C producer 504 are both able to send messages to Java consumer 505 and C consumer 506. These communications are facilitated by standard producer interfaces 501 and 502. In embodiments, these standard producer interfaces 501 and 502 pass information (e.g., message identifiers and data to be used in task executions) to the consumers 505 and 506. When sending a particular message, the producers 503 and 504 use information defined in an XML document to look up the destination queue (for consumer 505 or 506) and, potentially, the name of the plugin 509-511 that will handle the message at the destination.

In embodiments, data to be passed to the destination plugin is sent via a message object. As used herein a message object may refer to a part of a message that is a data container used to pass data to the queue (plugin) and, upon task execution, to return necessary data to the requesting client application. In some embodiments, data may be stored as key-value pairs within a message object.

Standard plugin interfaces 507 and 508 facilitate communication between the consumers and plugins (e.g., Java plugins 509 and 510 and C plugins 511). The plugin name included in a message may be used to dynamically load the correct plugin and pass any message object in the message to the plugin. The plugins 590-511 handle calling the appropriate functions for task execution and may pass back any data to the consumers 505 or 506 (e.g., for synchronous messages). While FIG. 5 depicts only two each of producers, consumers, and programming languages, it is contemplated that embodiments may utilize any number of consumers and producers that utilize a wide variety of programming languages.

Some embodiments of the present disclosure are particularly well-suited for use during system configuration and hardware discovery. This occurs, for example, when a computer is first started or a vendor modifies the computer to add new hardware. In these situations, a Vital Product Data (VPD) build/rebuild function may be used. As used herein, VPD may refer to a collection of informational and configuration data about a particular set of hardware. One potential problem is that during hardware discovery the VPD build function may be called several times in bursts when it only actually needs to be executed once. This results in the repeated, unnecessary rebuilds of the VPD file as several components make identical (repeated) requests for the VPD in a short period of time.

This VPD rebuild issue may be alleviated by embodiments. In particular, by sending all of the VPD rebuild request messages to a single queue and coalescing these messages together, the number of times that the task is actually executed can be drastically reduced. Then, upon completion of a particular rebuild function, the results may be returned to all of the components that had messages coalesced with the one that was actually executed.

Some embodiments of the present disclosure may offer various technical computing advantages over the prior art. These computing advantages address problems arising in the realm of computer middleware systems and the associated problems of computer performance and efficiency particularly as they relate to the delays in task execution that can occur when client applications send several messages in a short period of time. Implementation of embodiments of the methods described herein can result in improved system performance and technical computing advantages. Embodiments herein recognize that coalescing messages together in certain situations can have significant advantages (e.g., in terms of computing resources and speed) during function calls.

Figure 6:
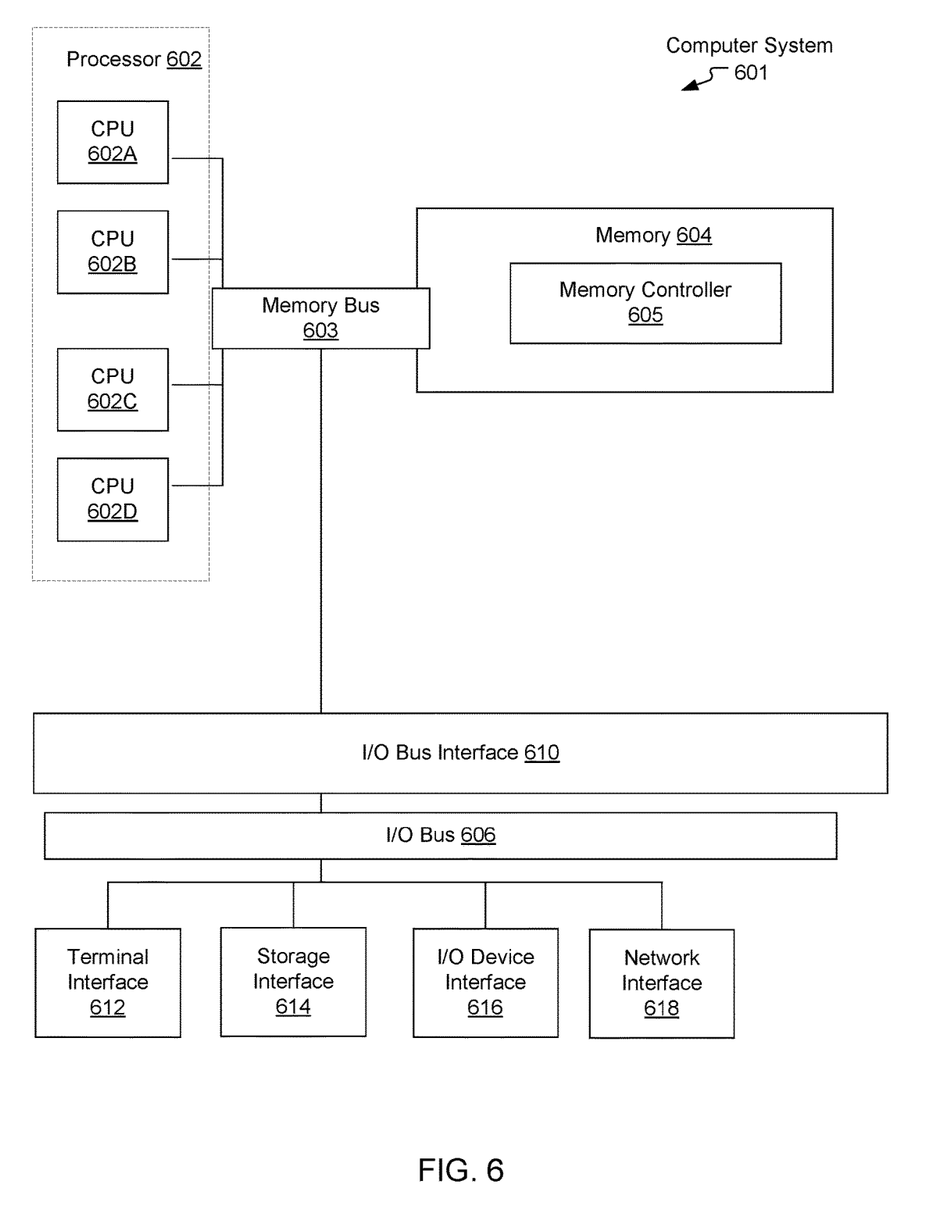
FIG. 6 illustrates a high-level block diagram of an example computer system that may be used in implementing embodiments of the present disclosure.

Referring now to FIG. 6, shown is a high-level block diagram of an example computer system (i.e., computer) 601 that may be used in implementing one or more of the methods or modules, and any related functions or operations, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 606, and an I/O bus interface unit 610.

The computer system 601 may contain one or more general-purpose programmable central processing units (CPUs) 602A, 602B, 602C, and 602D, herein generically referred to as the processor 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601, and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 604 may contain elements for control and flow of memory used by the Processor 602. This may include a memory controller 605.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 606 are shown as single respective units, the computer system 601 may, in some embodiments, contain multiple I/O bus interface units 610, multiple I/O buses 606, or both. Further, while multiple I/O interface units are shown, which separate the I/O bus 606 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "each" does not necessarily equate to the term "all" as the term "all" is used colloquially. For example, the following two phrases have different meanings: "a car having a plurality of tires, each tire of the plurality of tires being fully inflated" and "a car that has all of its tires fully inflated". The former phrase would encompass a car with three fully-inflated tires (the plurality of tires) and one flat tire (not included in the plurality of tires). The latter phrase would not encompass such a car (because not all of the car's tires are fully inflated). Likewise, the phrase "a computer having a set of files, each file of the set of files being read-only" would encompass a computer having two files, one of which is read-only (and belongs to the set of files) and one of which is not read-only (and does not belong to the set of files).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method for managing a plurality of vital product data (VPD) rebuild request messages, wherein each VPD rebuild request message is configured to cause a rebuild of a VPD file for hardware discovered during system configuration of a distributed system, the method comprising:

generating, by a first component of the distributed system and as part of hardware discovery during the system configuration, a first synchronous VPD rebuild request message;

receiving, at a VPD rebuild message queue of a message broker, the first message, wherein the message broker comprises a plurality of message queues, each message queue associated with a different task of a plurality of tasks, wherein the message broker is configured to handle messages received from a plurality of components of the distributed system, wherein at a time the first message is received there is an earlier-received synchronous VPD rebuild request message waiting in the VPD rebuild message queue, and wherein the earlier-received message is from a second component of the distributed system;

determining that a force execution flag in the first message is set to true; generating, by a third component of the distributed system and as part of hardware discovery during the system configuration, a second synchronous VPD rebuild request message;

receiving, at the VPD rebuild message queue and after receipt of the first message, the second message;

determining that at a time the second message is received the earlier-received message is waiting in the VPD rebuild message queue;

determining that a force execution flag in the second message is set to false;

coalescing, in response to the waiting message determination and the false flag determination, the second message with the earlier-received message such that a rebuild of the VPD file is executed only once for both messages and the rebuilt VPD file is returned to both the second component and the third component but not to the first component; and executing, in response to the true flag determination and after the rebuild of the VPD file, a second rebuild of the VPD file such that the second rebuilt VPD file is returned to the first component but not to the second component or the third component.

* * * * *